United States Patent [19]

Gregory et al.

[11] Patent Number: 5,113,966
[45] Date of Patent: May 19, 1992

[54] DOWNHOLE HYDRAULIC SEISMIC GENERATOR

[75] Inventors: Danny L. Gregory, Corrales; Harry C. Hardee; David O. Smallwood, both of Albuquerque, all of N. Mex.

[73] Assignee: The United States of America as represented by the United States Department of Energy, Washington, D.C.

[21] Appl. No.: 511,372

[22] Filed: Apr. 19, 1990

[51] Int. Cl.⁵ .............................................. G01V 1/40
[52] U.S. Cl. .................................. 181/106; 181/113; 181/121; 367/912
[58] Field of Search ............... 181/106, 113, 119, 121; 367/912; 175/40; 166/250, 65.1; 73/151, 152

[56] References Cited

U.S. PATENT DOCUMENTS

| | | | |
|---|---|---|---|
| 3,221,833 | 12/1965 | Malmberg | 181/0.5 |
| 3,282,371 | 11/1966 | Miller, Jr. | 18/0.5 |
| 3,718,205 | 2/1973 | Fair et al. | 181/0.5 H |
| 3,909,776 | 9/1975 | Broding et al. | 340/17 |
| 4,569,412 | 2/1986 | Bouyoucos et al. | 181/119 |
| 4,702,343 | 10/1987 | Paulsson | 181/106 |
| 4,805,727 | 2/1989 | Hardee et al. | 181/106 |

OTHER PUBLICATIONS

H. Hardee, "Downhole Periodic Seismic Sources", *Geophysical Prospecting*, vol. 31, 1983, pp. 57-71.
H. Hardee et al., "The Resonant Acoustic Pulser—A Continuous Frequency Marine Seismic Source", *Geophysics*, vol. 48, No. 8, Aug. 1983, pp. 1082-1089.
H. Hardee et al., "Probing The Melt Zone of Kilauea Iki Lava Lake, Kilauea Volcano, Hawaii", *Geophysical Research Letters*, vol. 8, No. 12, Dec. 1981, pp. 1211-1214.
H. Hardee et al., "Downhole Seismic Source", *Geophysics*, vol. 52, No. 6, Jun. 1987, pp. 729-739.
Ser. No. 312,683 filed Feb. 17, 1989 by Hardee et al.

*Primary Examiner*—J. Woodrow Eldred
*Attorney, Agent, or Firm*—Anne D. Daniel; James H. Chafin; William R. Moser

[57] ABSTRACT

A downhole hydraulic seismic generator system for transmitting energy wave vibrations into earth strata surrounding a borehole. The system contains an elongated, unitary housing operably connected to a well head aboveground by support and electrical cabling, and contains clamping apparatus for selectively clamping the housing to the walls of the borehole. The system further comprises a hydraulic oscillator containing a double-actuating piston whose movement is controlled by an electro-servovalve regulating a high pressure hydraulic fluid flow into and out of upper and lower chambers surrounding the piston. The spent hydraulic fluid from the hydraulic oscillator is stored and pumped back into the system to provide high pressure fluid for conducting another run at the same, or a different location within the borehole.

10 Claims, 4 Drawing Sheets

DOWNHOLE HYDRAULIC SEISMIC GENERATOR

The U.S. Government has rights in this invention pursuant to Contract No. DE-AC04-76DP00789 between the U.S. Department of Energy and AT&T Technologies, Inc.

FIELD OF THE INVENTION

The present invention relates to apparatus for generation of seismic energy waves for use in determining the structural characteristics of earth strata and, more particularly, to a self-contained seismic source able to generate excitation waveforms such as stationary random and pseudo-random bursts, as well as periodic functions such as sinusoidal sweeps, by means of an oscillating piston powered by a servo-controlled hydraulic actuator.

BACKGROUND OF THE INVENTION

Methods of conducting seismic exploration include the production and transmission of seismic waves through the earth's surface and the positioning of geophone receivers at strategic locations in the area of interest for receiving the direct or reflected signals. These signals are then correlated with the source of the seismic waves in an effort to determine the characteristics of the earth's strata in the area of interest.

Explosive charges and large vibrator trucks have been employed as commercial seismic sources for many years, but they have several disadvantages, including the unpredictable characteristics of the explosive sources. In recent years, interest has concentrated on the development of controlled, sweptfrequency seismic sources that can be used downhole with appropriate receivers positioned either in adjacent holes or on the surface. Early downhole sources suggested designs where the source of the vibratory power, be it pneumatic, hydraulic, electrical, or mechanical, was located on the surface and was somehow transmitted to a downhole actuator. Typical of these types of devices are those found in the teachings of the patents to Malmberg, U.S. Pat. Nos. 3,221,833; Miller, 3,282,371; Fair, et al., 3,718,205; and Brooding, et al., 3,909,776.

Other downhole seismic sources have been described for transmitting variable frequency seismic shear waves into earth strata formations surrounding a borehole. Such a system, for example, is described in the patent to Hardee, et al., U.S. Pat. No. 4,805,727.

Recent downhole seismic source designs have concentrated on either simplifying or eliminating the complex downhole supply piping. See, for example, the above-cited patent to Hardee, et al. and their CIP application filed Feb. 17, 1989, which proposes a downhole pneumatically-powered seismic source that is self-contained and operates off standard 7-conductor logging cable which is readily available in the logging industry. The system described in these references includes a seismic source that either carries a compressed or liquified gas charge, or else uses an internal tank system which can be recharged downhole between seismic runs by means of a small (¼ horsepower or less) electric motor which can be supplied through the relatively small conductors in the standard 7-conductor logging cable. However, the pneumatically-powered seismic sources contain disadvantages including a limitation on the type of excitation waveforms that can be generated.

Paulsson, in U.S. Pat. No. 4,702,343, proposes a downhole hydraulic-powered seismic source that is continuously supplied with 15 horsepower of electrical energy through a special cable that carries instrument lines and a nominal 15 kw electrical power line. However, hydraulic-powered seismic sources have heretofore been limited by the requirement that they be supplied with a large amount of electrical horsepower energy from a power source remaining on the surface. Hence, such hydraulic-powered seismic sources need to be used with a special cable to transmit the great amount of electrical energy down to the seismic source in the borehole.

SUMMARY OF THE INVENTION

These and other limitations associated with seismic sources that presently exist are overcome by the present invention which provides a downhole seismic source for operation within a borehole to produce seismic energy waves through surrounding earth strata. The seismic source comprises an elongated housing adapted for lowering into the borehole by means of a cable which also includes electrical cables for transmission of signals for operation of the seismic source generator. The system is compatible with commercially available, standard logging cable which contains both electrical signal transmission wires and support cable lines.

The housing carries a clamping apparatus and a hydraulic pressure source. The clamping apparatus selectively and rigidly clamps the housing to the wall of the borehole. Multiple radially-spaced shoe members are used to engage the wall of the borehole, and a clamp valve is used to selectively control a hydraulic fluid flow to multiple spring-retracting hydraulic clamps that are operably connected between the clamp valve and the shoe members. The hydraulic clamps extend and withdraw the shoe members to and from the wall of the borehole, respectively.

The hydraulic pressure source provides a flow of high pressure hydraulic fluid, through a shut-off valve, to an electro-hydraulic servovalve. The servovalve is responsive to electronic control signals from a well head control unit on the surface and is operably connected between the hydraulic pressure source and a hydraulic oscillator which is carried within the housing.

The hydraulic oscillator comprises an oscillator chamber with a double-actuating piston member disposed in the chamber to form upper and lower fluid cavities. The piston member has porting extending therethrough operably connected to the electro-hydraulic servovalve; the porting provides a supply and return conduit for a flow of hydraulic fluid to the upper and lower fluid cavities of the oscillator chamber, and the servovalve controls the flow of high pressure fluid into the hydraulic oscillator. The hydraulic oscillator produces a seismic vibration in the housing which is transmitted to the borehole wall by means of the clamping apparatus and which ultimately produces seismic energy waves. A pump driven by an electric motor self-contained within the housing receives low pressure exhaust fluid from a low pressure accumulator, and outputs a high pressure fluid into a heat exchanger which delivers the high pressure fluid to recharge a high pressure accumulator to make ready for the start of the generation of another set of seismic energy waves.

Both hydraulic and pneumatic actuators are but different types of fluid actuators for the purpose of driving an associated piston oscillator to generate seismic waves. Either type of fluid oscillator, i.e., one using a hydraulic actuator circuit or one using a pneumatic actuator circuit, can be operated in a resonant or non-resonant mode depending on the oscillatory features that are desired. In the present disclosure, a seismic source is used with a gas-charge fluid accumulator in conjunction with a hydraulic supply system. Although only the vertical dipole oscillatory mode is described, various other oscillatory modes such as monopole, horizontal dipole, and torsional dipole modes, could easily be adapted to the basic design described herein.

Additionally, other excitation waveforms than the periodic functions of the generator in the earlier patent to Hardee, et al. can be easily adapted to the servo-controlled hydraulic actuator of the present invention. Examples of additional excitation waveforms possible with the hydraulic actuator of the present invention include various types of stationary random and pseudorandom bursts.

Other objects, features and advantages of the invention will be set forth in, or apparent from, the detailed description of the embodiments of the invention which follow.

BRIEF DESCRIPTION OF THE DRAWINGS

The invention will become more readily apparent from the following exemplary description taken in conjunction with the accompanying drawings, in which.

DETAILED DESCRIPTION OF THE PREFERRED EMBODIMENTS

Figure 1:
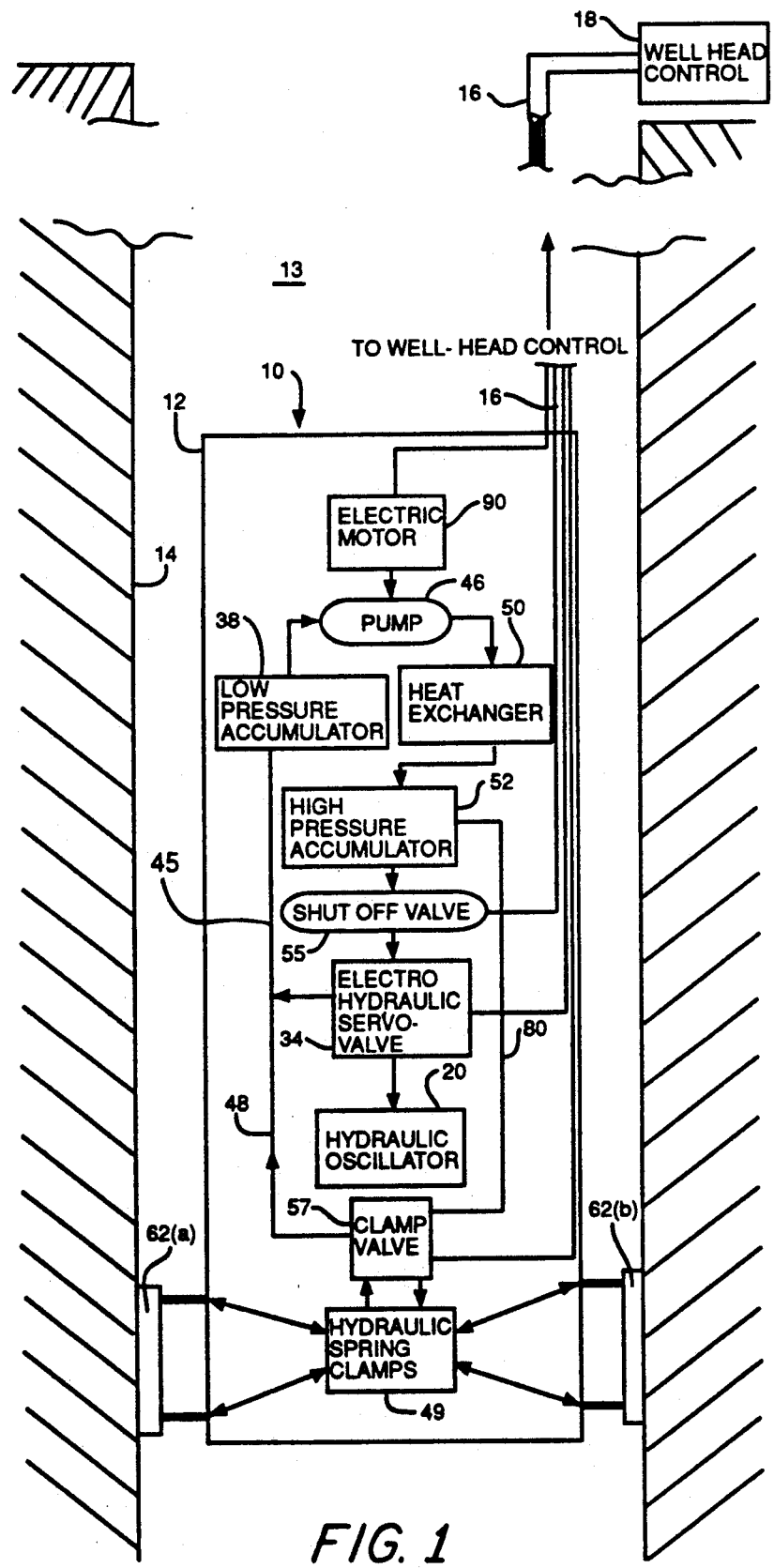
FIG. 1 is a schematic block diagram of the downhole seismic generator according to the present invention.

With reference now to the drawings in which like numerals represent like elements through the several views, a downhole seismic generator, generally designated as 10, is depicted in schematic block diagram form in FIG. 1. Seismic generator 10 comprises an elongated housing 12 with components within housing 12 shown in detail in the elevational view of FIG. 2. Downhole hydraulic seismic generator 10 is located in a borehole 13 having a wall surface 14 and is attached by a standard 7-conductor logging cable 16 to a well head control unit 18 that remains on the surface. Well head control unit 18 provides electronic control signals, as well as physical support, to downhole seismic generator 10 which is positioned underground either in a well head casing, such as a pipe, or in a channel bored into the earth's crust.

Within downhole seismic generator 10 is a high pressure accumulator 52 comprising a high pressure gas chamber 54 and a high pressure hydraulic fluid chamber 56 for holding pressurized hydraulic fluid. Chambers 54 and 56 are separated by a piston or flexible wall membrane 58 so that high pressure gas chamber 54 maintains the hydraulic fluid in high pressure hydraulic fluid chamber 56 as further (incompressible) hydraulic fluid is pumped into high pressure hydraulic fluid chamber 56 and piston or membrane 58 is moved.

Figure 2:
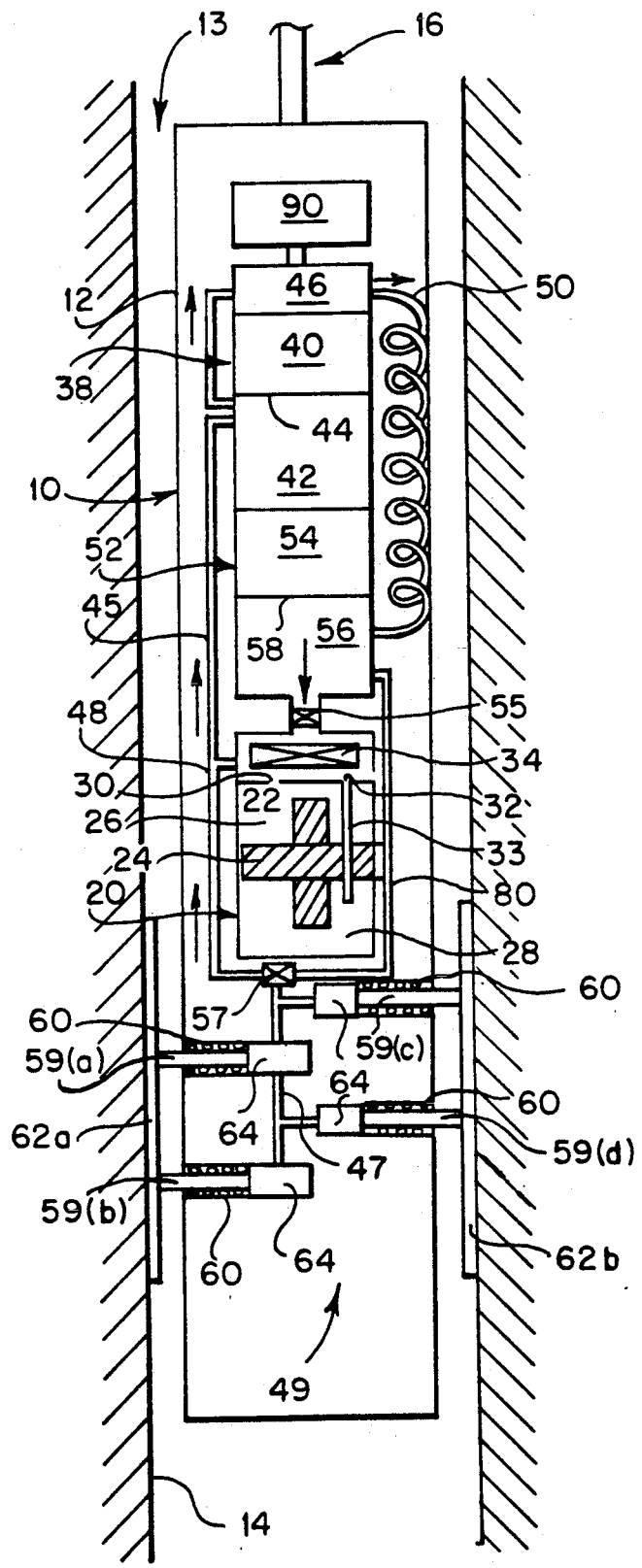
FIG. 2 is a schematic elevational view of components of the downhole seismic generator according to the present invention.

High pressure accumulator 52 is connected by conduit 80, e.g., suitable tubing, to a clamp valve 57 which controls hydraulic fluid flow to and from hydraulic spring clamps 49 for the attachment and the release of downhole seismic generator 10 with respect to wall surface 14. Clamp valve 57 is a solenoid, electrically-driven valve, controlled by electrical control signals from well head control unit 18. Clamp valve 57 provides high pressure hydraulic fluid to hydraulic spring clamps 49; clamp valve 57 receives signals from well head control unit 18. Clamp valve 57 provides high pressure hydraulic fluid to hydraulic spring clamps 49 which comprise miniature piston actuators 59a, 59b, 59c and 59d, each having a piston chamber 64 where hydraulic fluid enters from connecting tubing 47. Each miniature piston actuator 59 has a preset force exerted inwardly thereon by a spring 60. Miniature piston actuators 59a and 59b are connected to a wall clamp 62a and miniature piston actuators 59c and 59d are connected to wall clamp 62b, as shown in FIG. 2, for rigidly securing downhole seismic generator 10 to wall surface 14. A conduit 48 is connected to an output of clamp valve 57 for receiving fluid expelled from hydraulic spring clamps 49 when downhole seismic generator is released from wall surface 14.

At the base of high pressure accumulator 52 is a solenoid shut-off valve 55, operated by signals from well head control 18, and connected to an electro-hydraulic servovalve 34. When solenoid shut-off valve 55 is opened, high pressure fluid is delivered at input 53 to electro-hydraulic servovalve 34, as shown in greater detail in FIG. 3.

High pressure fluid is divided from input 53 to travel through channels 53a and 53b into an area commonly referred to as the "spool" 35 of electro-hydraulic servovalve 34. Spool 35 comprises a rod 37 to which are attached perpendicular members 39a, 39b, 39c and 39d. One end 82 of rod 37 is engaged in a support 84, while the other end 86 of rod 37 is connected to a voice coil comprising a magnet 63 adjacent to small electromagnetic shakers 41 connected by wire 43 to cable 16. Electronic signals are received from control unit 18 by electromagnetic shakers 41 which cause a force to be exerted on spool 35, producing a controlled movement to the left or the right. Port openings 30 and 32 from spool 35 extend downward through electro-hydraulic servovalve 34 and connect with a hydraulic oscillator 20. A displacement gage 91 is connected to wire 92 and in turn to cable 16 which transmits the position of the spool valve 35 to the well head controller 18.

Figure 3:
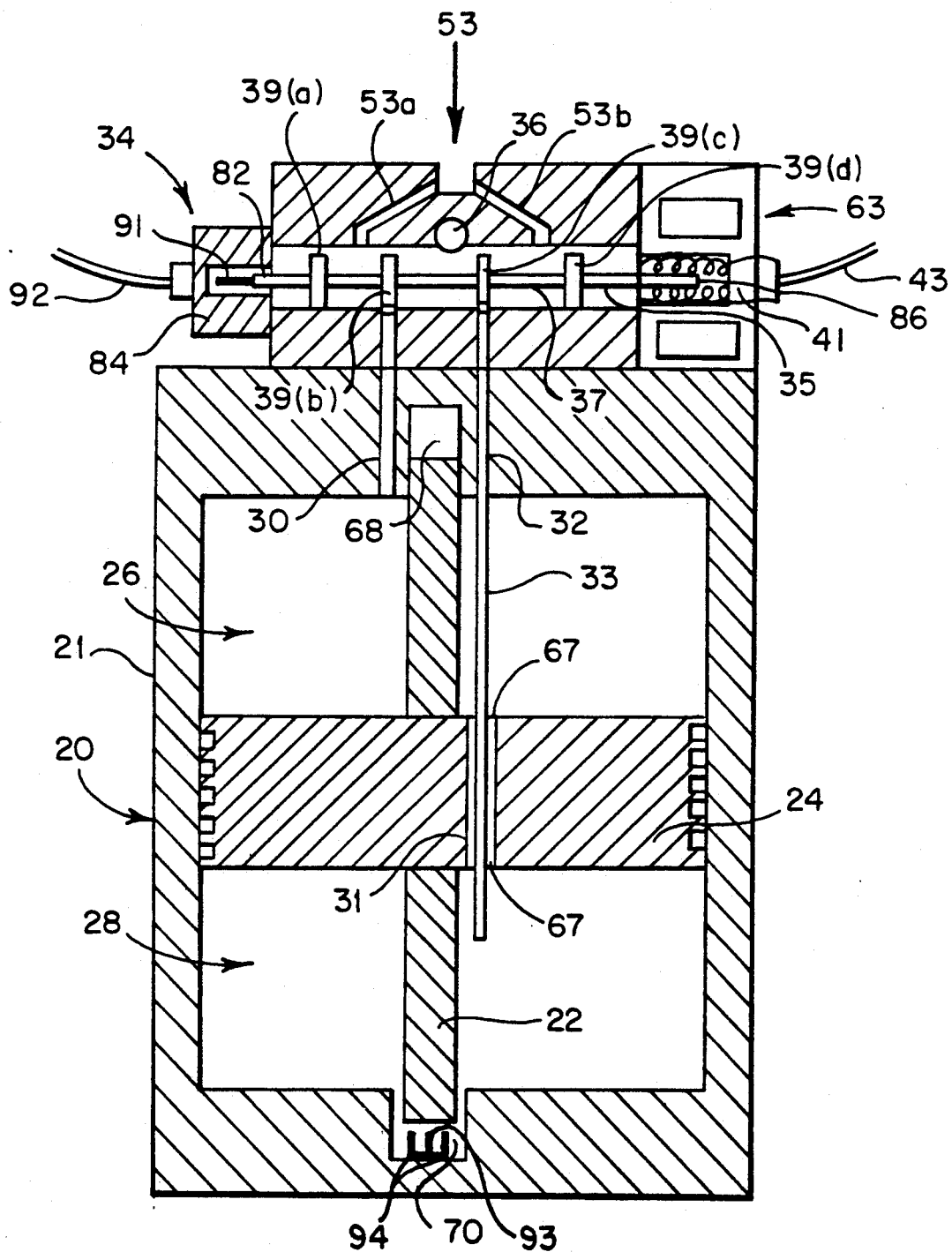
FIG. 3 is an enlarged view of the electro-hydraulic servovalve and piston chamber depicted in the downhole seismic generator of FIGS. 1 and 2.

Hydraulic oscillator 20 comprises a double-actuating piston 24, which is typically a component of a hydraulic shaker. In a standard hydraulic shaker, the servovalve typically will lie on the side of a piston chamber 21, 90 degrees from where it is shown in FIGS. 2 and 3. The shaker would be rotated, and it would not be necessary to use special porting to the bottom chamber. However, in using piston chamber 21 to generate energy waves underground from within a borehole as in the present invention, downhole seismic generator 10 is required generally to be lowered into holes of small diameter. Thus, electro-hydraulic servovalve 34 is not able to be placed on the side of piston chamber 21 because it would cause an increase in the diameter of the overall device and thus would severely limit downhole seismic generator 10 to use with only certain well casings or boreholes of uncommonly large diameters.

The structures of electro-hydraulic servovalve 34 and hydraulic oscillator 20 shown in FIG. 3 avoid this limitation by having electro-hydraulic servovalve 34 placed directly above piston chamber 21. Special porting (described subsequently) thus allows the servovalve 34 and hydraulic oscillator 20 to be containerized in the smallest volume and hole diameter possible, compatible with underground seismic source generation.

Referring to FIG. 3, hydraulic oscillator 20 comprises a vertical support member 22 on which is mounted a reaction mass comprising double-actuating piston 24 which divides hydraulic oscillator 20 into an upper piston chamber 26 and a lower piston chamber 28. Upper piston chamber 26 is connected to electro-hydraulic servovalve 34 by port 30. Lower piston chamber 28 is connected to electro-hydraulic servovalve 34 by port 32 and tube extension 33. Tube extension 33 is bored through double-actuating piston 24, with seals 67 placed at each end of bored channel 31. Vertical support member 22 provides a support to guide the longitudinal movement of piston 24, with vertical support member 22 also having movement itself by virtue of gaps 68, 70 at each end of vertical support member 22. Hydraulic fluid is thus transferred between electro-hydraulic servovalve 34 and hydraulic oscillator 20 by means of port 30 and port 32 with tube extension 33.

Figure 4:
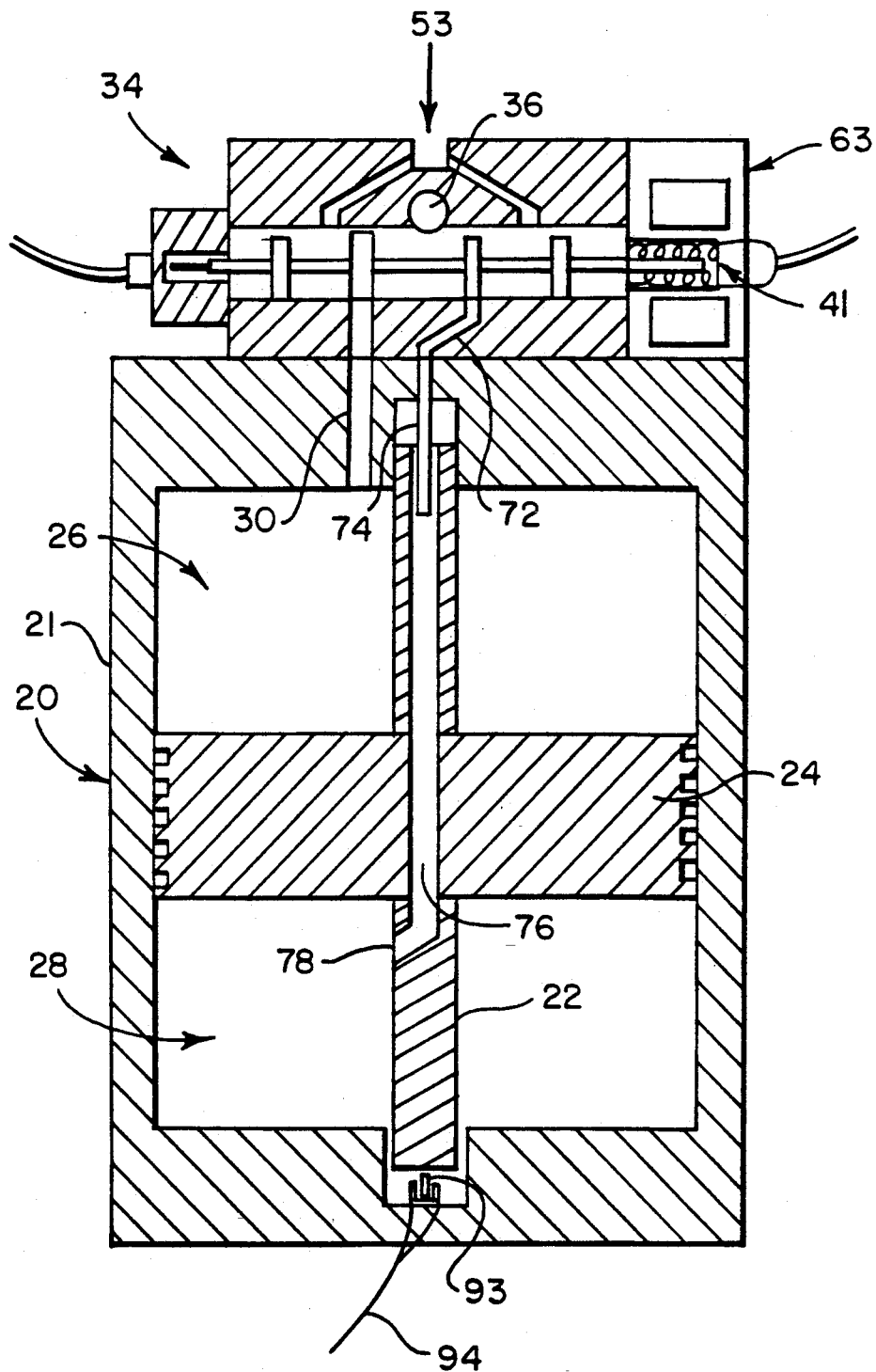
FIG. 4 is an enlarged view of a second embodiment of the electro-hydraulic servovalve and piston chamber according to the present invention.

Spool 35 in one position allows high pressure fluid to enter upper piston chamber 26 through port 30, while when moved to another position, spool 35 closes port 30 and allows the high pressure fluid to enter lower piston chamber 28 through port 32 and tube extension 33. Double-actuating piston 24 moves in response to high pressure being exerted within the upper or the lower piston chamber. Hence, seismic energy waves are generated according to a predetermined pattern of electrical signals controlling movement of spool 35 of electro-hydraulic servovalve 34. A displacement of gage 93 electrically connected by wire 94 to cable 16 transmits the position of the piston 24 to the well head controller 18. Gage 93 and wire 94 are also illustrated in FIG. 4.

Electro-hydraulic servovalve 34 also comprises a low pressure fluid output port 36 from which fluid is expelled from spool 35 of electro-hydraulic servovalve 34, into a low pressure return line 45. Low pressure return line 45 could be, for example, suitable tubing, and conducts spent hydraulic fluid to a low pressure accumulator 38. Low pressure accumulator 38 is made up of a low pressure gas chamber 40 and a low pressure hydraulic fluid chamber 42, with the two chambers 40, 42 separated by a piston or flexible membrane 44. The output of low pressure accumulator 38 is inputted to a pump 46, driven by an electric motor 90. Pump 46 receives a low pressure fluid and inputs energy to that fluid to provide a high pressure fluid output which is inputted to high pressure accumulator 52 to replenish fluid supply and ready underground seismic generator 10 for another run, thus recycling the fluid and recharging downhole seismic generator 10.

Turning now to a typical operation of downhole seismic generator 10 as described and presented in FIGS. 1-2, downhole seismic generator 10 is initially placed into borehole 13 in a fully charged state, i.e., with hydraulic fluid chamber 56 filled with high pressure fluid.

Clamp valve 57 is then actuated to cause downhole seismic generator 10 to become secured to inner wall surface 14 of borehole 13 by the expansion outwardly of wall clamps 62a-b. Signals from well head control unit 18 open clamp valve 57, causing high pressure fluid to be delivered to miniature piston actuators 59a-d. Each miniature piston actuator 59a-d is thus forced outward and, hence, wall clamps 62a, 62b become rigidly pressed against inner wall surface 14. Fluid does not flow through miniature piston actuators 59, but rather respective piston chambers 64 are either subject to a high pressure fluid or are not. Thus, when clamp valve 57 is in one position, it delivers high pressure fluid which causes wall clamps 62a, 62b to move outward with a force equal to the pressure of the hydraulic fluid times the engaging area of the miniature piston actuators 59a-d. Consequently, this allows the seismic energy of downhole seismic generator 10 to be coupled into the wall surface 14 (as explained subsequently).

When clamp valve 57 is placed in a second position, the fluid in contact with miniature piston actuators 59a-d is at a low pressure and, hence, flows out under the force of respective springs 60a-60d on each miniature piston actuator 59a-59d. When the high pressure is thus removed, springs 60 are of sufficient spring constant stiffness to cause wall clamps 62a and 62b to retract back. Downhole seismic generator 10 can then be moved up or down to a new position in borehole 13. If downhole seismic generator 10 is lowered into a hole bored directly into the ground without any well casing, wall clamps 62a-b expand outwardly and press directly against the earth; if lowered down into a pipe, wall clamps 62a-b press against the wall of the pipe.

Once placed in rigid contact with inner wall surface 14 of borehole 13, operation of downhole seismic generator 10 starts with a signal from well head control unit 18 opening shut-off valve 55 at the base of high pressure hydraulic fluid chamber 56. This causes high pressure fluid to be delivered at input 53 to electro-hydraulic servovalve 34. Movement of electro-hydraulic servovalve 34 is controlled by electronic signals from well head control unit 18 aboveground, and this movement regulates the flow of high pressure fluid into upper piston chamber 26 and lower piston chamber 28, and the corresponding expelling of fluid from these chambers. The manner of this fluid control determines the type of seismic energy wave generated by movement of double-actuating piston 24.

Once the high pressure fluid in high pressure hydraulic fluid chamber 56 has been depleted, and exhausted from hydraulic oscillator 20 and through electro-hydraulic servovalve 34 as spent fluid into low pressure return line 45, one test has been completed. Pump 46 is then activated to recycle the fluid and to recharge downhole seismic generator 10. Pump 46 is driven by small electric motor 90, rated at 0.5 hp in the preferred embodiment. Low pressure fluid is pumped from low pressure accumulator 38 and delivered as a high pressure fluid to a heat exchanger 50. Heat exchanger 50 serves to expel heat from the fluid prior to delivering the hydraulic fluid to refill high pressure accumulator 52. During the recharge time, downhole seismic generator 10 might be moved up or down in borehole 12 and reclamped to inner wall surface 14 at a new location. By the time downhole seismic generator 10 is reclamped at a new location, high pressure hydraulic fluid chamber 56 would presumably be recharged (refilled) and the system ready to repeat the test, or run a different one.

FIG. 4 presents an alternative construction for electrohydraulic servovalve 34 and piston chamber 21. The configuration, similar to that shown in FIG. 3, presents an alternative supply and return conduit to lower piston cavity 28. A port 72 extends through electro-hydraulic servovalve 34, and connects with a conduit 74. Conduit 74 extends downward into a vertical channel 76 bored within vertical support member 22 and piston 24, to provide a port opening 78 into lower piston chamber 28 from vertical support member 22, as shown. Port 30 for upper piston chamber 26 is the same as in the embodiment of FIG. 3.

In the downhole seismic generator described, the operator does not need to supply a high amount of electrical power to the system, which may be several thousand feet into the ground. The operator need only supply a reasonable amount of electrical power sufficient to run 0.5 hp motor 90 and allow it to run for only a period of time to pump enough fluid energy into high pressure accumulator 52 to run a seismic excitation. The invention thus allows the use of known technology (in terms of well logging cable and equipment), while providing a self-contained and enclosed system.

Although the present invention has been described relative to exemplary embodiments thereof, it will be understood by those skilled in the art that variations and modifications can be effected in these exemplary embodiments without departing from the scope and spirit of the invention.

We claim:

1. A downhole seismic source for operation within a borehole to produce seismic energy waves through surrounding earth strata, comprising:
    an elongated housing adapted for lowering into the borehole by a cable means;
    a hydraulic oscillator means carried by said housing for producing seismic vibrations in said housing;
    a hydraulic pressure source carried by said housing for providing a flow of high pressure hydraulic fluid, comprising a pump means for recycling said hydraulic fluid and for recharging the downhole seismic source and an electric motor for driving said pump means, said hydraulic pressure source further comprising a low pressure fluid accumulator which receives spent hydraulic fluid from said hydraulic oscillator means and from said clamp valve means and outputs hydraulic fluid to said pump means which outputs a high pressure hydraulic fluid, a heat exchanger means for receiving the high pressure fluid from said pump means and for dissipating heat produced by said pump means in the hydraulic fluid, and a high pressure accumulator for receiving the high pressure hydraulic fluid from said heat exchanger means and for providing the high pressure fluid as an output to an electro-hydraulic servovalve means, whereby the downhole seismic source is recharged for future operation;
    an electro-hydraulic servovalve means operably connected between said hydraulic pressure source and said hydraulic oscillator means for controlling said flow of high pressure hydraulic fluid from said hydraulic pressure source into said hydraulic oscillator means which thus produces said seismic vibrations; and
    a clamping means carried by the housing for selectively, rigidly clamping said housing to the wall of said borehole and for allowing said seismic vibrations to be transmitted from said housing through said clamping means to the earth strata, said clamping means comprising a plurality of shoe members radially-spaced from a longitudinal axis of said housing which are selectively engageable with the wall of the borehole, a piston actuator means for each said shoe member for moving said respective shoe member into engagement with the wall of the borehole when subject to a fluid pressure, a clamp valve means for selectively connecting a flow of high pressure hydraulic fluid from said hydraulic pressure source to activate said piston actuators, and a spring means for each said piston actuator for retracting a respective said shoe member from engagement with the wall of the borehole in the absence of a fluid pressure on said piston actuator.

2. A downhole seismic source according to claim 1, wherein said hydraulic oscillator means moves reciprocally in said housing and longitudinally with respect to the borehole to produce the seismic energy waves; and
    wherein said electro-hydraulic servovalve means comprises a control means for providing operational control of said servovalve for reciprocally driving said hydraulic oscillator.

3. A downhole seismic source according to claim 1, wherein the plurality of shoe members comprise two oppositely disposed shoe members.

4. A downhole seismic source according to claim 1, and further including a shut-off valve means fluidly connected between said high pressure accumulator and said electro-hydraulic servo-valve means for selectively providing the high pressure fluid to said servovalve means.

5. A downhole seismic source according to claim 4, wherein said shut-off valve means comprises at least one electrically operated solenoid valve.

6. A downhole seismic source according to claim 5, wherein said hydraulic oscillator means comprises an oscillator chamber, a reciprocating double-actuating piston member disposed in said oscillator chamber to form an upper fluid cavity and a lower fluid cavity, said piston member having first porting means extending through said piston member and operably connected to said servovalve means for providing a supply and return fluid flow between said servovalve means and said lower fluid cavity of said oscillator chamber, and second porting means for providing a supply and return fluid flow between said servovalve means and said upper fluid cavity of said oscillator chamber.

7. A downhole seismic source according to claim 5, wherein said hydraulic oscillator means comprises an oscillator chamber having an upper fluid cavity and a lower fluid cavity, a double-acting piston means which seperates said fluid cavities, a vertical support member mounting said piston means for longitudinal movement within said oscillator chamber, and channel means in said support member for providing a fluid supply and return between said servovalve means and said lower fluid cavity.

8. A downhole seismic source according to claim 7, wherein said vertical support member is movable longitudinally in said oscillator chamber with said piston means over a discreet range of movement.

9. A downhole seismic source according to claim 5, wherein said electro-hydraulic servovalve means comprises a driver coil means for receiving electronic control signals to cause movement of said servovalve means accordig to a predetermined pattern.

10. A downhole seismic source system for underground generation of seismic energy waves comprising:

an elongated housing which is placed in an underground channel;

well head control means for generation and output of control signals from an an aboveground location;

connector means attached to the housing for the support of said housing and for transmission of said control signals; and a seismic source generator means located in said housing for generating seismic energy waves in response to said control signals, said seismic source generator means comprising:

a high pressure accumulator means for storing hydraulic fluid, said high pressure accumulator means comprising a high pressure gas chamber means for maintaining a high hydraulic fluid pressure at an output of said high pressure accumulator means;

a shut-off valve means connected to the output of said high pressure accumulator means for selectively providing the high pressure fluid;

a hydraulic oscillator means for generating seismic energy comprising an oscillator having a double-actuating piston movable within said chamber;

a servovalve control means operably connected between said shut-off valve means and said hydraulic oscillator means for receiving the high pressure fluid from said shut-off valve means and for providing a regulated output of high pressure fluid into said hydraulic oscillator means to provide a controlled movement of the double-actuating piston for the generation of the seismic energy waves, and for receiving spent hydraulic fluid from said hydraulic oscillator means;

a low pressure accumulator means for receiving spent hydraulic fluid from said servovalve control means, said low pressure accumulator means comprising a low pressure gas chamber means for maintaining a controlled fluid pressure in said low pressure accumulator means;

an electric pump means within the housing for receiving the spent hydraulic fluid from said low pressure accumulator means, for inputting energy to the fluid, and for delivering a high pressure fluid output;

a heat exchanger means connected to said pump means for receiving high pressure fluid from said pump means, for dispelling heat from the high pressure fluid, and for delivering the high pressure fluid to said high pressure accumulator means; and clamp means for selectively and rigidly connecting the seismic source generator to a surrounding wall, comprising a plurality of shoe members attached to spring retracting hydraulic piston means for selectively extending and withdrawing said members relative to the surrounding wall.

* * * * *